(12) United States Patent
Happel

(10) Patent No.: US 12,000,527 B2
(45) Date of Patent: Jun. 4, 2024

(54) DEVICE FOR SUPPORTING A MONITOR

(71) Applicant: ONDAL MEDICAL SYSTEMS GMBH, Hünfeld (DE)

(72) Inventor: Jonathan Happel, Tann (DE)

(73) Assignee: ONDAL MEDICAL SYSTEMS GMBH, Hünfeld (DE)

( * ) Notice: Subject to any disclaimer, the term of this patent is extended or adjusted under 35 U.S.C. 154(b) by 0 days.

(21) Appl. No.: 17/268,624

(22) PCT Filed: Aug. 16, 2019

(86) PCT No.: PCT/EP2019/072058
§ 371 (c)(1),
(2) Date: Feb. 16, 2021

(87) PCT Pub. No.: WO2020/035612
PCT Pub. Date: Feb. 20, 2020

(65) Prior Publication Data
US 2021/0172562 A1    Jun. 10, 2021

(30) Foreign Application Priority Data
Aug. 16, 2018   (EP) ..................................... 18189325

(51) Int. Cl.
*F16M 11/10*   (2006.01)
*F16M 11/18*   (2006.01)
*F16M 13/02*   (2006.01)

(52) U.S. Cl.
CPC ............. *F16M 11/10* (2013.01); *F16M 11/18* (2013.01); *F16M 13/02* (2013.01); *F16M 2200/063* (2013.01)

(58) Field of Classification Search
CPC .... F16M 11/046; F16M 11/048; F16M 11/10; F16M 11/18; Y10S 248/917
See application file for complete search history.

(56) References Cited

U.S. PATENT DOCUMENTS 5,088,676 A * 2/1992 Orchard ............... F16M 11/046
248/421
6,301,988 B1 * 10/2001 Brogårdh ............... B25J 9/1065
74/490.03
(Continued)

*Primary Examiner* — Bradley Duckworth
(74) *Attorney, Agent, or Firm* — MEDLER FERRO WOODHOUSE & MILLS PLLC

(57) ABSTRACT

The present invention relates to a device (1, 100) for supporting a monitor (4), preferably a pivotable monitor carrier, comprising a connection element (21) for connecting to a monitor (4) and a support frame (20) for supporting the device (1) against the environment, wherein the connection element (21) and the support frame (20) are arranged pivotably relative to each other, wherein the support frame (20) and the connection element (21) are pivotably connected to each other by means of a non-uniformly translating transmission for providing the pivotability of the connection element (21) relative to the support frame (20), or the support frame (20) and the connection element (21) are pivotably connected to each other by means of at least one rotary joint (110) for providing the pivotability of the connection element (21) relative to the support frame (20), wherein a motor (120), preferably an electric motor, for supporting the pivot movement of the connection element (21) relative to the support frame (20) is provided.

12 Claims, 12 Drawing Sheets

(56) References Cited

U.S. PATENT DOCUMENTS

Figure 1:
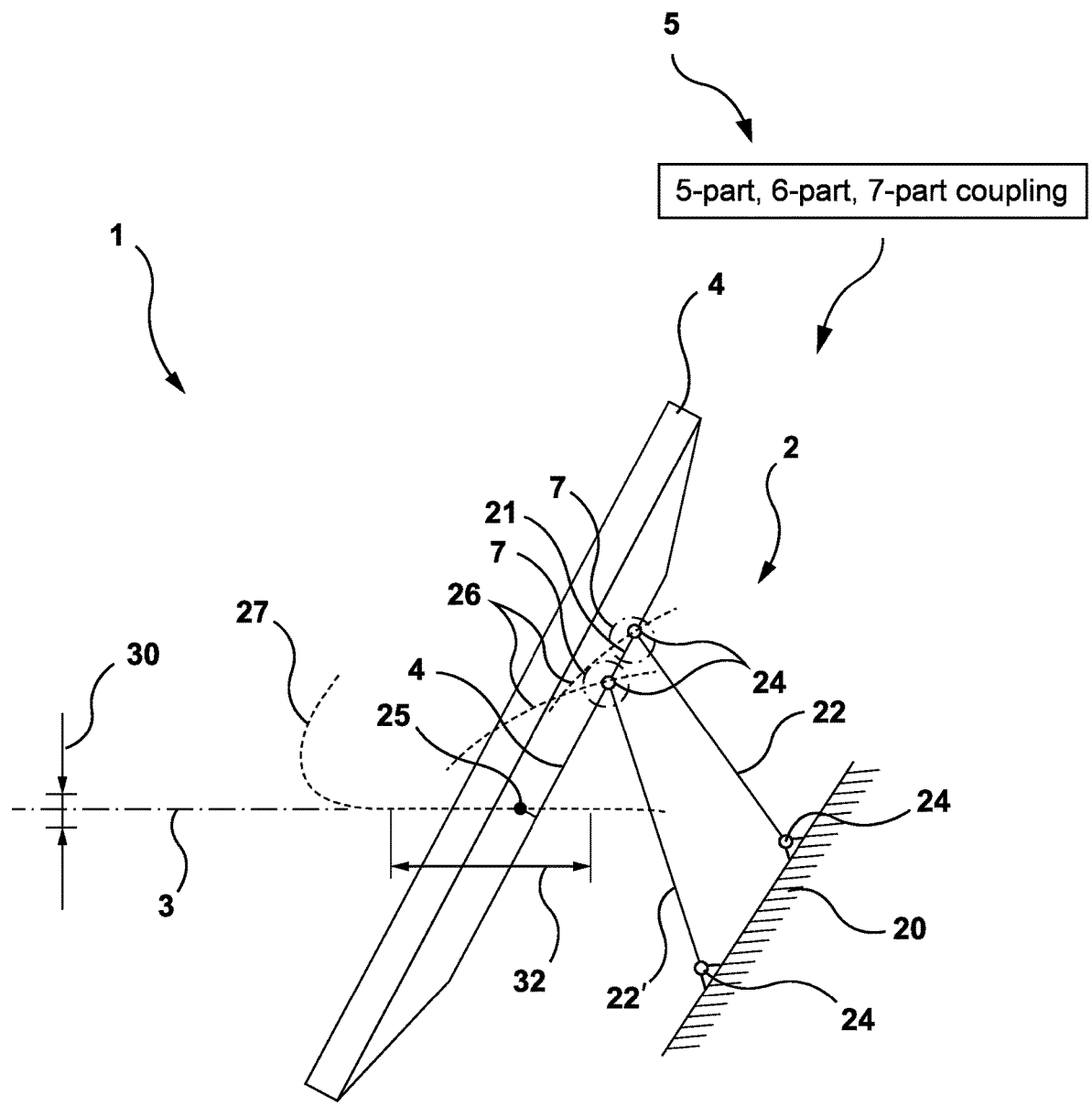

| | | | | |
|---|---|---|---|---|
| 6,412,363 B1* | 7/2002 | Brogårdh | ................... | B25J 9/02 |
| | | | | 74/490.05 |
| 6,540,471 B1* | 4/2003 | Brogårdh | ................. | B25J 9/104 |
| | | | | 414/729 |
| 7,513,474 B2* | 4/2009 | Anderson | .............. | F16M 11/10 |
| | | | | 248/284.1 |
| 7,630,193 B2* | 12/2009 | Ledbetter | ................ | F16M 11/10 |
| | | | | 361/679.21 |
| 7,887,014 B2* | 2/2011 | Lindblad | ................ | F16M 11/24 |
| | | | | 248/123.11 |
| 9,372,512 B2* | 6/2016 | Yeh | ........................ | F16M 11/10 |
| 9,622,360 B1* | 4/2017 | Smith | ................. | F16M 11/2021 |
| 9,625,091 B1* | 4/2017 | Massey | ................. | F16M 13/022 |
| 10,172,447 B2* | 1/2019 | Graham | ................. | F16M 11/00 |
| 10,738,941 B2* | 8/2020 | Newville | ............ | F16M 11/2021 |
| 2004/0054438 A1* | 3/2004 | Brogårdh | ............. | B25J 17/0266 |
| | | | | 700/245 |
| 2005/0051688 A1 | 3/2005 | Dittmer | | |
| 2008/0054133 A1* | 3/2008 | Huang | ................. | F16M 13/022 |
| | | | | 248/178.1 |
| 2008/0296452 A1* | 12/2008 | Kim | ..................... | F16M 13/027 |
| | | | | 248/222.11 |
| 2009/0095869 A1* | 4/2009 | Hazzard | ............. | F16M 11/2014 |
| | | | | 248/398 |
| 2012/0033371 A1* | 2/2012 | Pankros | ................. | F16M 13/02 |
| | | | | 361/679.21 |
| 2012/0293937 A1 | 11/2012 | Myerchin | | |
| 2014/0346292 A1 | 11/2014 | Tabata | | |
| 2017/0300083 A1* | 10/2017 | Park | ........................ | F16M 11/24 |
| 2019/0064886 A1* | 2/2019 | Wendt | ................... | G06F 1/1681 |
| 2021/0289644 A1* | 9/2021 | Zarnowitz | ............ | H05K 5/0234 |

* cited by examiner

DEVICE FOR SUPPORTING A MONITOR

CROSS-REFERENCE TO RELATED APPLICATIONS

The present application is a U.S. National Phase of PCT/EP2019/072058, filed Aug. 16, 2019, which claims priority to EP18189325A, filed Aug. 16, 2018, the disclosures of each of which are incorporated by reference herein in their entireties.

TECHNICAL FIELD

The present invention relates to a device for carrying a monitor, preferably a pivotable monitor.

BACKGROUND ART

Devices for carrying a monitor, also denoted as "monitor carriers", are commonly known. Here, monitors are known with and without a tilt feature. "Tilt feature" refers to a pivotability of the monitor in the surrounding space.

In order to provide the pivotability of the mounted monitor, traditional monitor carriers comprise a connection element, which is pivotable against a support frame which is rigidly connected to the environment, for example a ceiling, a wall or a floor of room, or a mobile frame, by connecting the connecting element to the support frame by means of a tilting joint. The tilting joint is thus formed as rotary joint having a fixed axis of rotation.

"Tilting" of the monitor to align a monitor to a working position of a user who is at least temporarily using the monitor and thus to enhance a readability of the monitor, for example, is thus achieved by pivoting around the fixed axis of rotation.

Thus it is known, that for a monitor which is attached to the connection element, the rotary joint is arranged behind the monitor. This has the advantage that the configuration of such a monitor carrier is simple, and thus causes only small manufacturing costs. Due to the pivoting around the fixed axis of rotation, the elevation level of the center of gravity of the monitor is changed during a pivoting of the monitor. Because of this, operation forces required to pivot the monitor are comparatively high.

In order to reduce high operation forces, monitor carriers are known which comprise a spring for assistance. Here, the spring acts against gravity, thus the resulting operation force, which is to be applied, is reduced. Providing the spring increases the costs of the device. In addition, it is technically complex to align the spring force to the weight of the monitor. Finally, the spring does not "press" upwards by means of a counterforce in any angular position corresponding to the degree the gravity presses the monitor down, as the force generated by the spring is proportional to the spring path, and in addition depends on the position of the connection element, the support frame, and the spring relative on one another.

In addition, it is known to reduce the operation force by decoupling the friction in the rotary joint while pivoting the monitor against gravity. The friction is only required to keep the monitor in position in order to prevent that the monitor tilts down by itself. For pivoting upwards, that is against gravity, no friction is required from a functional point of view. Hereto, directionally actuated couplings may be provided by means of which the friction may be decoupled while pivoting against gravity. This has the advantage that the frictional force, and thus the operation force during pivoting against gravity is reduced. However, due to providing said couplings, such a monitor carrier includes a complicated configuration, at the same time it is of course expensive to manufacture due to its technically complex parts.

Monitor carriers are for example known from US 2008/0054133 A1 or US 2006/0175499 A1.

In addition, it is known to provide the rotary joint laterally of the monitor. Hereto, the connection element comprises a laterally protruding extension arm, which is connected laterally of the installation space of the monitor to be carried to the support frame by means of the rotary joint. In said embodiment, the operation forces may be reduced compared to monitor carriers including a rotary joint behind the monitor, in particular in case, the axis of rotation of the rotary joint is located in a region of the center of gravity of the monitor. This way, changing an elevation of the center of gravity may basically be prevented. However, such monitor carriers are due to the protruding extension arm and the torques acting on the rotational bearing and the support frame expensive and heavy. Finally, the size of the monitor, which is supported by monitor carrier, is limited by the length of the extension arm. In case, an existing monitor has to be replaced by a monitor including a larger screen diagonal, for example, it may thus be required to replace also the monitor carrier.

Presentation of the Invention

Based on the known state of the art, it is an objective of the present invention to provide an enhanced device for carrying a monitor, in particular a pivotable monitor carrier. It is in particular an objective of the present invention to provide a device for carrying a monitor by using a reduced operation force required by a user during pivoting of the carried monitor.

Said objective is solved by a device for carrying a monitor, preferably a pivotable monitor carrier, using the features of claim 1. Advantageous developments result from the dependent claims, the specification, and the figures.

Correspondingly according to the invention, a device for carrying a monitor, preferably a pivotable monitor, comprising a connection element for connecting to a monitor and a support frame for supporting the device against the environment is provided, wherein the connection element and the support frame are arranged pivotably relative to each other. Further, the support frame and the connection element are pivotably connected to each other by means of a non-uniformly translating transmission for providing the pivotability of the connection element relative to the support frame.

As the support frame and the connection element are pivotably connected to each other by means of a non-uniformly translating transmission for providing the pivotability of the connection elements relative to support frame, a simple pivot movement of a monitor mounted on the connection element may be enabled In addition, it also becomes possible to arrange the tilt mechanism for the monitor which is implemented as a non-uniformly translating transmission behind the monitor, thus it is possible to ensure a simple and cost-efficient design. No protruding extension arms have to be provided, and also no additional torques have to be received by the monitor carrier based on a lever arm of the extension arm. Rather, the non-uniformly translating transmission may be arranged close to the center of gravity of the monitor behind thereof in a functionally controlled way. In particular, compared to traditional devices includes a laterally arranged rotary joint, the manufacturing costs and the complexity of configuration may also be reduced.

In addition, it is also possible that during pivoting of the monitor mounted to the connection element, basically no or only little elevation energy has to be input into the system consisting of monitor and device. In other words, the monitor may be kept about the same elevation level regarding the center of gravity thereof. This results in smaller operation forces during pivoting. This is in particular advantageous as compared to traditional devices including rotary joints which are arranged behind the monitor.

The one skilled in the art knows "non-uniformly translating transmissions" as transmissions which comprise a non-uniform translation. In other words, for said transmissions, the translation between an input part of the transmission and an output part of the transmission is not constant.

Corresponding to a further preferred embodiment, the non-uniformly translating transmission may be configured in a way that a predefined point which is held in a fixed position relative to the connection element, is guidable during a pivot movement of the connection element by means of the non-uniformly translating transmission relative to the support frame within a predefined pivot angle along a predefined path length in a region of a horizontal plane. In other words, the nonuniformly translating transmission may be configured thus, that at least within a predefined pivot angle, a straight guidance of the point is provided along a predefined path length.

For this purpose, the transmission may for example comprise one or more rotary joints and/or coupling parts, which are for example connected to each other at least in pairs by means of respective rotary joints, for example. In particular, the transmission may hereto be formed as coupling transmission. The coupling transmission may for example be configured as a 4-part double swingarm. This way, the support frame may be configured as a frame of the coupling transmission. The connection element may provide the swingarm of the coupling transmission. The connection element and the support frame may for example be connected by means of coupling parts, whereby each of the coupling parts is rotatably connected on one end to the connection element by means of a rotary joint and/or may be connected on another end to the support frame line by means of a further rotary joint, respectively.

In particular, in case the non-uniformly translating transmission is configured in a way that the point which is held relative to the connection element in a fixed position corresponds to a center of gravity of a monitor mounted to the connection element or comes approximately close thereto, a pivot movement of the monitor may at least be performed within a predefined pivot angle, without a change or only a small change of the elevation level of the monitor—related to the center of gravity thereof—may occur. This way, during pivoting of the monitor, no or only little vertical lifting forces have to be applied for lifting the monitor, but essentially only forces to overcome a friction or tilting of the monitor.

"Pivot angle" denotes in the present invention an angle between two different orientations of the monitor relative to the gravitational acceleration. Here, the angle is the one which results from forming an imaginary plane wherein the screen of the monitor essentially extends, and crosses a first orientation plane of the monitor to a second orientation plane. The angle enclosed by these two planes is denoted as "pivot angle".

The term "region" is understood in this sense to denote that the point does not have to remain at exactly the same elevation level, but the point may also shift to a small extent relative to its elevation level. In other words, the position of the point can move up or down within a certain tolerance, preferably less than or equal to ±10 cm, particularly preferred ±5 cm, more particularly preferred ±2.5 cm, and most preferred ±1 cm, ±0.5 cm, ±0.3 cm, ±0.2 cm, ±0.1 cm, or ±0.05 cm.

The point which is fixed in position is preferably spaced from the connection element.

According to an alternative preferred embodiment, the non-uniformly translating transmission is configured in a way that a predefined point which is held at a fixed position relative to the connection element, is held during a pivot movement of the connection element by means of the coupling transmission relative to the support frame within a predefined pivot angle in a region of a fixed point in space. In other words, the position of the point in space does not change or changes only to a minor degree. This way, during pivoting of the monitor, only little lifting forces have to be used for lifting the monitor and for pulling it forward or backward.

For this purpose, the transmission may for example comprise one or more rotary joints and/or coupling parts or parts, which, for example, are connected to each other at least in pairs by means of the respective rotary joints, for example. In particular, the transmission may be formed as coupling transmission hereto. The coupling transmission may for example comprise an 8-part coupling transmission. At the support frame, two L-shaped parts may be rotatably fixed by being spaced to each other, which may define further coupling parts. The rotary joints for connecting to the support frame may be provided in a middle portion of the parts. This way, regarding the number of parts of the coupling transmission, each one of the parts may be regarded as two single parts, which are connected to each other in a rotatably fixed way. In addition, the L-shaped parts may be respectively connected on one end to an upper coupling part in a pivotable way and/or connected on other end to a lower coupling part in a pivotable way. Rotary joints for connecting the parts to the upper and lower coupling part may here be arranged on each of the coupling parts spaced to each other, wherein the distance thereof at the upper and at the lower coupling parts is preferably identical. The coupling parts may be respectively connected to the connection element on an opposite end in a pivotable way. The 8 parts of the coupling transmission may then be formed by the 4 single parts, the two coupling parts, the support frame, and the connection element.

"Region" denotes here, that the point does not have to be fixed exactly on the same coordinates in space, but the point may shift in space to a small degree. In other words, the position of the point may range within a predetermined tolerance, preferably less or equal about ±10 cm in any spatial directions, in particular preferred ±5 cm, more preferred ±2.5 cm in any spatial directions. Preferably, the tolerance in and opposite to the direction of the gravitational acceleration may be preferably less than or equal to ±5 cm, particularly preferred ±2.5 cm, more particularly preferred ±1 cm, and most preferred ±0.5 cm, ±0.3 cm, ±0.2 cm, ±0.1 cm, or ±0.05 cm.

According to a further preferred embodiment, in case the connection element and/or the nonuniformly translating transmission are formed such that the point corresponds to a center of gravity of a monitor attached to the connection element, the monitor attached to the connection element may be pivoted while no or only little lifting forces are required during pivoting of monitor.

According to a further preferred embodiment, the non-uniformly translating transmission is a coupling transmission. This way, in particular a simple pivoting of a monitor mounted to a connection element may be achieved. In addition, it is thus possible to arrange the tilt mechanism for the monitor which is realized as coupling transmission behind the monitor in a simple way, thus a simple and cost efficient configuration may be achieved, as no protruding extension arms have to be provided. Rather, the coupling transmission may be arranged close to the center of gravity of the monitor behind it. In particular, as compared to traditional devices comprising a laterally arranged rotary joint, the manufacturing costs and the complexity of configuration may also be reduced.

In addition, it is thus possible that during pivoting of the monitor mounted on the connection element, essentially no or only little elevation energy has to be input into the system consisting of monitor and device. In other words, the monitor may be held at about the same elevation level regarding the center of gravity thereof. This results in only small operation forces during pivoting. This is in particular advantageous compared to traditional devices including rotary joints which are arranged behind the monitor.

According to a further preferred embodiment, the coupling transmission is configured as a 3-part, 4-part, 5-part, 6-part, 7-part, or 8-part coupling transmission. This way a simple design may be realized, thus the manufacturing costs can be kept low.

And especially robust and simple configuration of the device may be achieved, in case the coupling transmission is configured according to a further preferred embodiment as double swing arm. Due to the general kinematics setup of the double spring arm, it may be prevented that the connection element extends completely peripheral around the support frame. Rather, it may be achieved that the connection element may only swing in a predetermined region. This way, it may be prevented that the connection element and/or the monitor mounted thereon is conflicting with other portions of the device, in particular the support frame.

In case the coupling transmission is formed as a thrust crank 10, preferably using a straight guidance, the configuration of the coupling transmission may be implemented in a particularly simple way. The straight guidance is thus preferably adapted such that an essentially horizontal guidance of a center of gravity is provided of a monitor mounted on the device.

According to a further preferred embodiment, when the support frame corresponds to a frame of the coupling transmission, a particularly simple configuration of the device may be achieved as no additional or only few parts are required for forming the frame of the coupling transmission.

In the present invention, "frame of the coupling transmission" denotes a part of the coupling transmission, which is arranged at a fixed position relative to an external support of the device in space, thus is not subjected to a movement in space while pivoting the monitor. By means of the frame, forces acting in the coupling transmission are received and transferred to the environment. The external support may for example be formed as a direct connection on the ceiling or wall of a room, or as a flexible carrier arm system, which may be flexibly positioned in the room, or may be formed as slidable carrier frame.

In order to provide the configuration of the device in a particular simple and robust way, according to a further preferred embodiment, the connection element may correspond to a swing arm of the coupling transmission. This way, no additional parts for realizing the swing arm are required.

According to a further preferred embodiment, the coupling transmission includes coupling parts between the support frame and the connection element, wherein the coupling parts are preferably at least provided twice, wherein in particular preferred, the coupling parts are arranged relative to a symmetry plane in a mirror-symmetrical way. This way, the coupling transmission may be configured particularly robust, and in addition, a particularly rigid configuration of the device may be provided in a simple way.

In a further preferred embodiment, the single parts of the coupling transmission, preferably comprising coupling parts, frame and/or swing arm, are pivotably connected to respective adjacent parts, preferably a rotary joint is arranged to provide a connection between the single parts.

According to a preferred development, a rotary joint may be a sliding bearing, preferably a sliding bearing having a collar.

Further, according to a preferred development, a rotary joint may comprise at least one screw or bolt, preferably for providing a required pressure force and/or a frictional force on the rotary joint. By means of the frictional force, it may preferably be ensured that the coupling transmission is not pivoting on its own, in case the center of gravity of the monitor should not be exactly in the assumed center of gravity.

According to a preferred development, a rotary joint is formed in a way that a screw or bolt acts as a rotational bearing, preferably by supporting and/or guiding the screw or bolt in a sliding bearing.

According to further preferred embodiment, at least one nut may be provided for clamping of screws or bolts which are arranged opposite to one another.

Further, according to a further preferred embodiment, a cable attachment may be provided for supporting and/or guiding connection cables for the monitor.

In order to reduce the required operations forces, the coupling transmission according to a preferred development may comprise a spring element for supporting the pivot movement, preferably a pressure spring, a tension spring and/or a gas pressure spring.

When at least one rotary joint of the non-uniformly translating information, preferably the coupling transmission, is configured to be frictionally decoupled at least when pivoting against a direction of the torque acting on the non-uniformly translating transmission, preferably the coupling transmission, due to the force of gravity from the mass of the mounted monitor, wherein preferably a sprag (or overrunning) clutch is provided on the rotary joint, the required operation forces may be further reduced in the direction mentioned above. In particular this applies as the friction forces in the rotary joint(s) of the coupling transmission are only required to hold the monitor in its position, that is to act against a torque acting on the coupling transmission which has been generated by the mass of the monitor in the center of gravity thereof. Preferably, thus a sprag (or overrunning) clutch is provided at the at least one rotary joint.

According to a further preferred embodiment, the device is configured for connecting to a monitor on the backside thereof, that is behind the monitor. This way, this device may be arranged behind the monitor while carrying the monitor.

According to a further preferred embodiment, in case the device comprises also a motor for supporting the pivot movement of the connection element relative to the support frame, the required operation forces and/or torques which have to be applied by the user for the pivot movement may further be reduced.

According to a further preferred embodiment, the device also comprises a sensor element for detecting at least one measured value, preferably a force sensor and/or a torque sensor, wherein the device is configured such that in case the measured value detected by the sensor element is larger than or equal to the predetermined threshold, the motor is activated to assist pivot movement.

Such a sensor control is especially advantageous for the non-uniformly translating transmission and/or in case the fixed point corresponds to the center of gravity of the monitor attached to the connection element. Then, it is in particular easy to specify a uniform operation force or adjustment force for pivoting the monitor by a user. Correspondingly, the threshold for supporting by the monitor may be specified in a particular well way. There is no risk, for example, that the threshold is set too close to the force for overcoming the frictional force and/or the gravity to pivot the monitor as it may be independent from the position of the support device. Thus, for example, a complex and expensive control may be omitted, and nevertheless the pivot movement is simple and intuitive for a user.

Preferably, the measured value is a force detected by the sensor element which is applied by a user, or a torque detected by the sensor element which is applied by a user.

The motor may be preferably be formed as a servomotor, which provides a respective force or a respective torque corresponding to the measured value detected by the sensor element. This way, preferably also an acceleration and/or a speed of the pivotable movement of the monitor may be set and/or adjusted.

According to a further preferred embodiment, the device further comprises an operation switch for operating the motor, wherein the operation switch comprises a first switching position, which corresponds to a switched-off state of the motor, a second switching position for operating the motor in a first direction of rotation, and a third switching position for operating the motor in the direction of rotation opposite to the first direction of rotation. This way it is possible to control the pivot movement of the monitor by means of operation switch both for a pivot movement upwards as well downwards.

In a preferred development, a remote control for controlling the motor may be provided spaced from the device. This way, a user may control a pivoting of the monitor, without having to approach the device, that is without having to leave the own workplace, in which he/she uses the monitor.

Preferably, some or all joints of the device for carrying the monitor have only one degree of freedom, in particular respective joints of the non-uniformly translating transmission. For example, the respective joints may be formed by respective bearings, in particular by respective roller bearing and/or sliding bearing, which include one single degree of freedom regarding rotation. Preferably, the respective axis of rotation of the joints are essentially arranged parallel to each other, in particular the axes of rotation of the respective joints of the non-uniformly translating transmission. Preferably, the rotational axes of the joints do not cross each other. The non-uniformly translating transmission may thus be without any crossings. Preferably, the respective joints are arranged spaced from one another. In particular, the non-uniformly translating transmission may be configured such that the respective connection lines between the axis of rotation thereof which are directly coupled to one another by means of the respective parts, do not cross and/or overlap especially when viewed along the respective axes of rotation. Thus, a particularly simple and compact configuration may be formed, in particular, in case the transmission is configured as coupling transmission.

In a further preferred development, the support frame and the connection element are connected pivotably to each other by means of at least one rotary joint for providing the pivotability of the connection element relative to the support frame, wherein a motor, preferably an electric motor, is provided for assisting the pivotal movement of the connection element relative to support frame. The motor may correspond to a motor already described above and/or act on the rotary joint. The rotary joint may in particular be a joint by means of which the support frame is connected to a wall, a floor, a drivable frame or another object in the environment. However, it may also be e.g. another rotary joint of the non-uniformly translating transmission, or an additional joint which does not belong to the transmission itself. A support by means of a joint may enable a compact design, a transfer of force with minor losses and/or a high torque without having to reinforce the device. Thus, the motor may also easily be updated.

Said objective is further solved by a device for carrying a monitor, preferably a pivotable monitor carrier, including the features of claim 16. Advantageous developments result from the dependent claims, the specification, and the figures.

Correspondingly, a device is presented for carrying a monitor comprising a connection element for connecting to a monitor and a support frame for supporting the device against the environment, wherein the connection element and the support frame are arranged pivotably relative to one another. Here, the support frame and the connection element are connected pivotably by means of at least one rotary joint for providing the pivotability of the connection element relative to the support frame, wherein a motor, preferably an electric motor, is provided for assisting the pivotal movement of the connection element relative to support frame.

By providing the motor, preferably the electric motor, for supporting the pivot movement of the connection element relative to the support frame, an operating force may be reduced, which has to be applied by a user for pivoting the monitor about the rotary joint, as the motor itself provides a force or a torque by means of which the motor acts in the direction of the pivot movement. The motor may thus support the pivot movement of the monitor or assume it completely. In other words, in the latter case, the motor may provide a force or a torque which is sufficient to move the monitor without additional external forces.

According to a further preferred embodiment, the device further comprises a sensor element for detecting at least one measured value, preferably a force sensor and/or a torque sensor, wherein the device is configured such that when the measured value detected by the sensor element is larger than or equal to a predetermined threshold, the motor is activated to assist the pivot movement.

Preferably, the measured value is a force detected by the sensor element which is applied by a user, or a torque detected by the sensor element which is applied by a user.

The motor may be preferably be formed as a servomotor, which provides a respective force or a respective torque corresponding to the measured value detected by the sensor element. This way, preferably also an acceleration and/or speed of the pivot movement of the monitor may be set and/or adjusted.

According to a further preferred embodiment, the device further comprises an operation switch for operating the motor, wherein the operation switch comprises a first switching position, which corresponds to a switched-off state of the motor, a second switching position for operating the motor in a first direction of rotation, and a third switching position for operating the motor in a direction of rotation opposite to the first direction of rotation. Hereby it is possible to control the pivot movement of the monitor by using the operation switch.

In a preferred development, a remote control for controlling the motor may be provided remote of the device. This way, a user may control a pivoting of the monitor without having to approach the device, that is without having to leave his/her actual workplace, where he/she uses the monitor.

The device may synonymously also be denoted as "pivotable monitor carrier".

SHORT DESCRIPTION OF THE FIGURES

Figure 2:
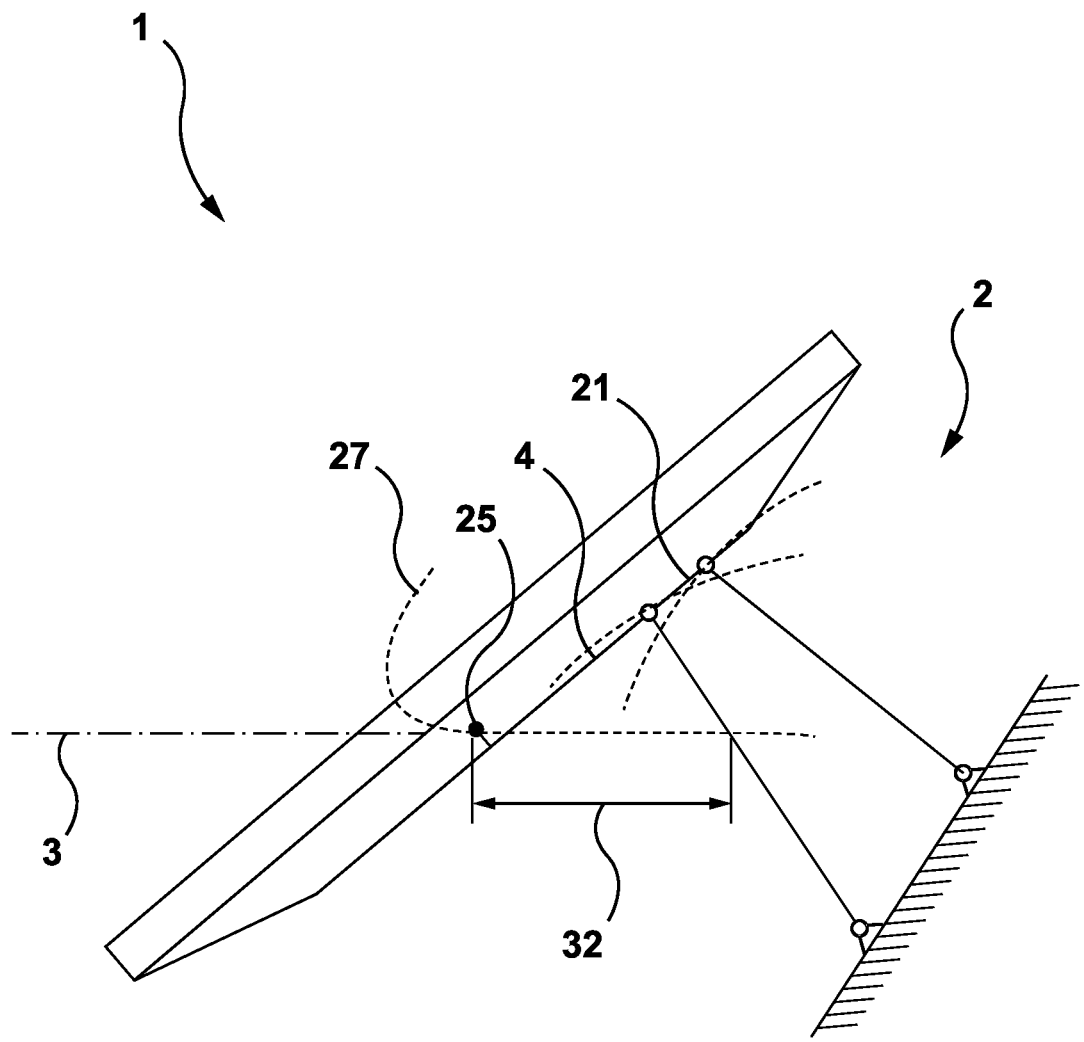
Figure 3:
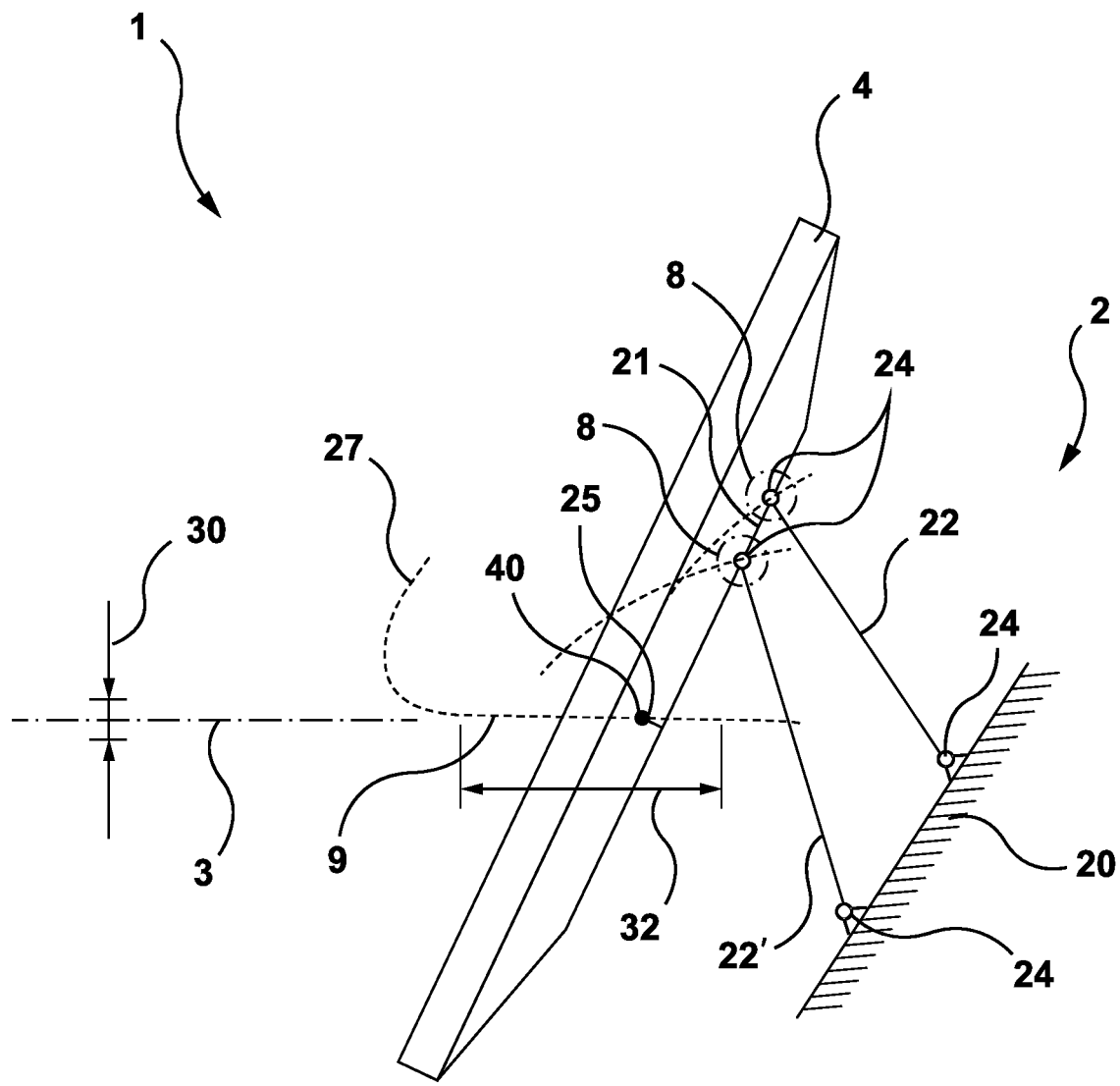
Figure 4:
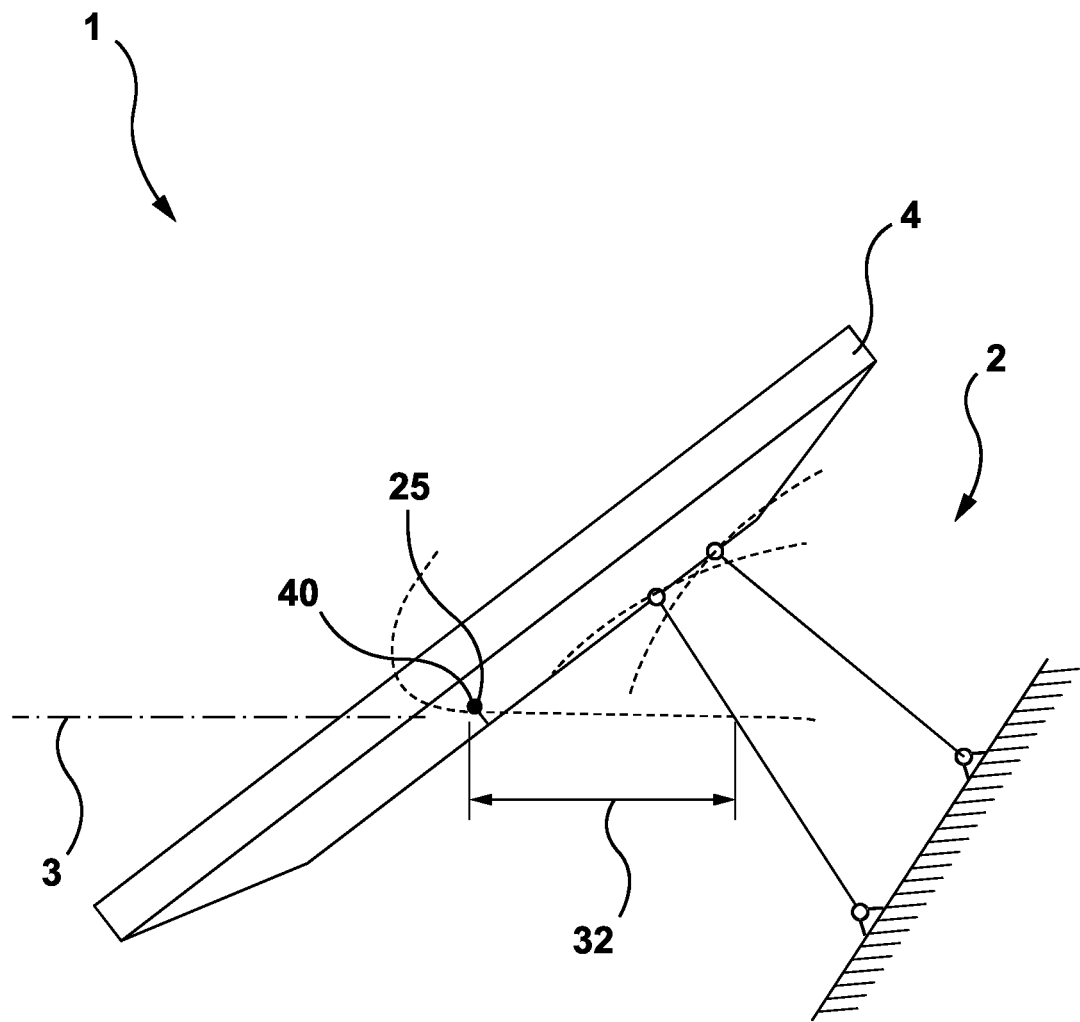
Figure 5:
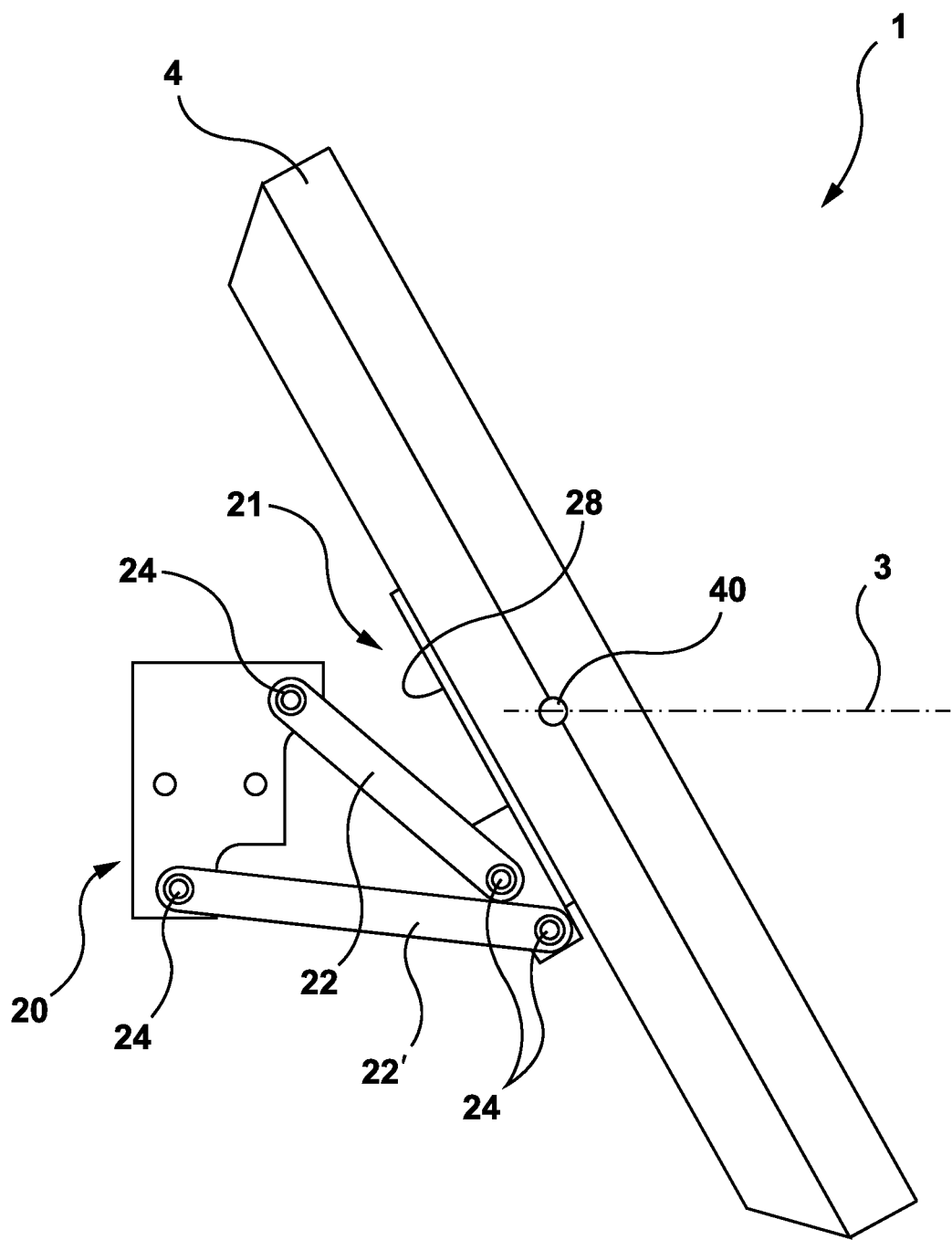
Figure 6:
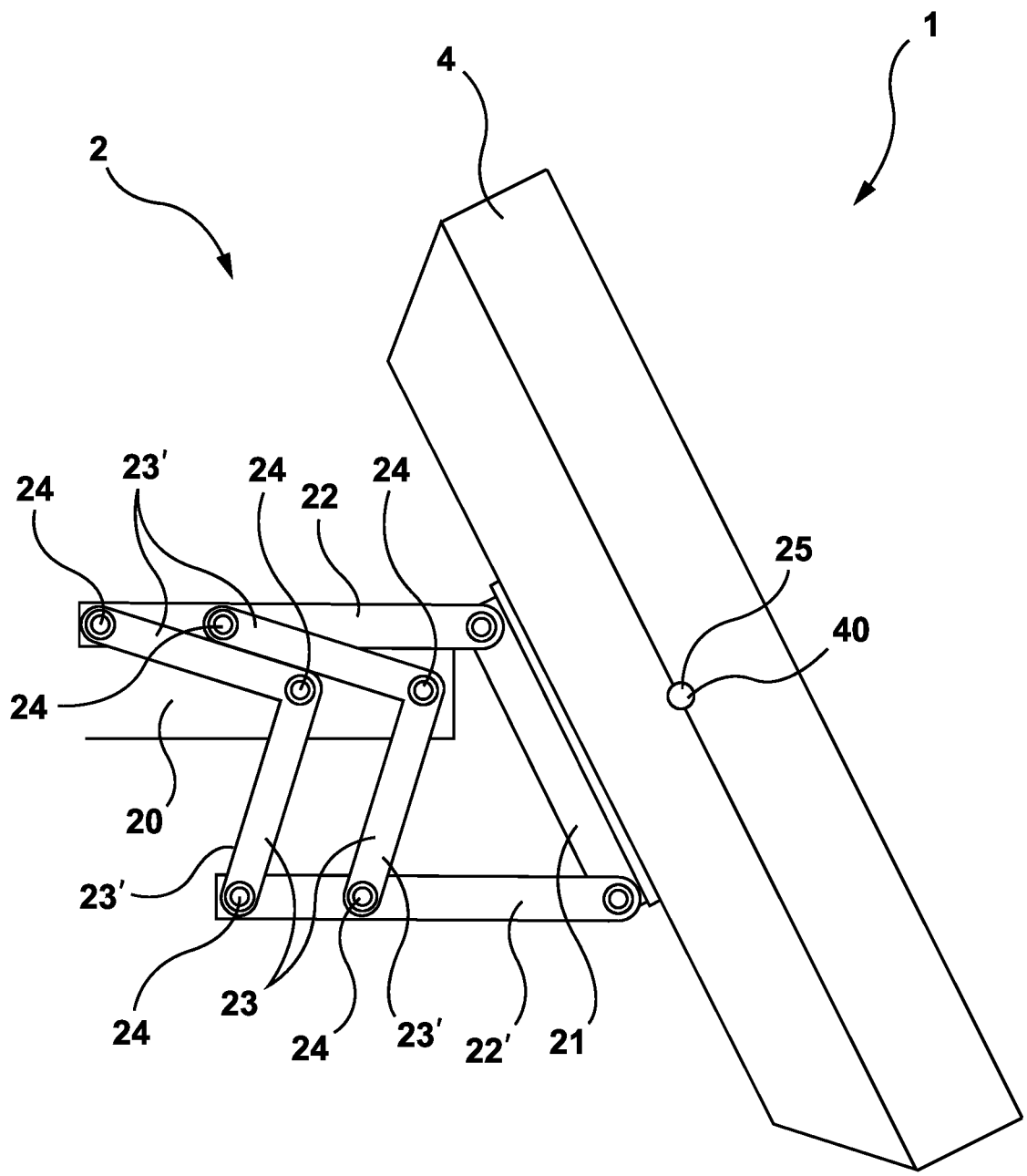
Figure 7:
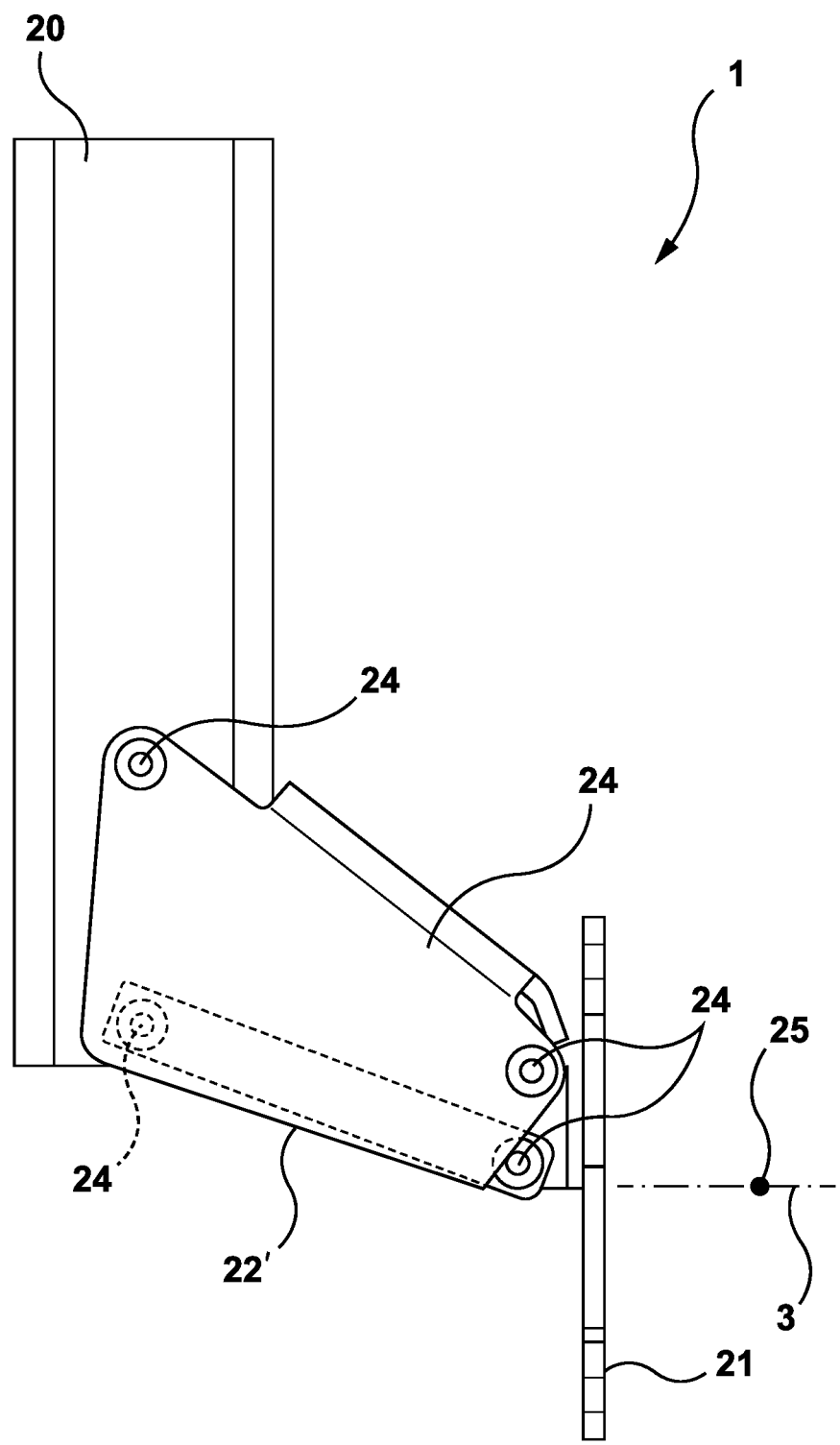
Figure 8:
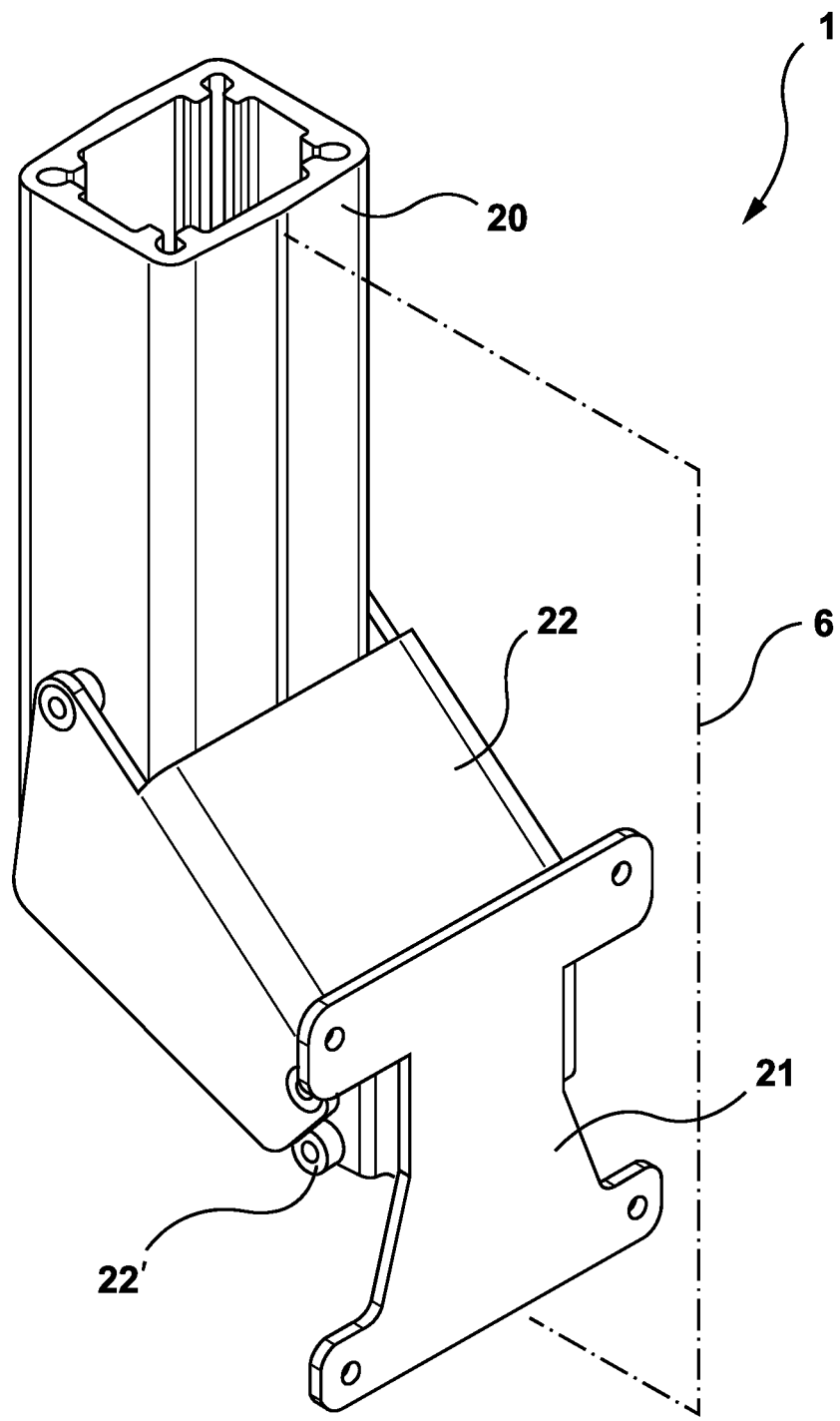
Figure 9:
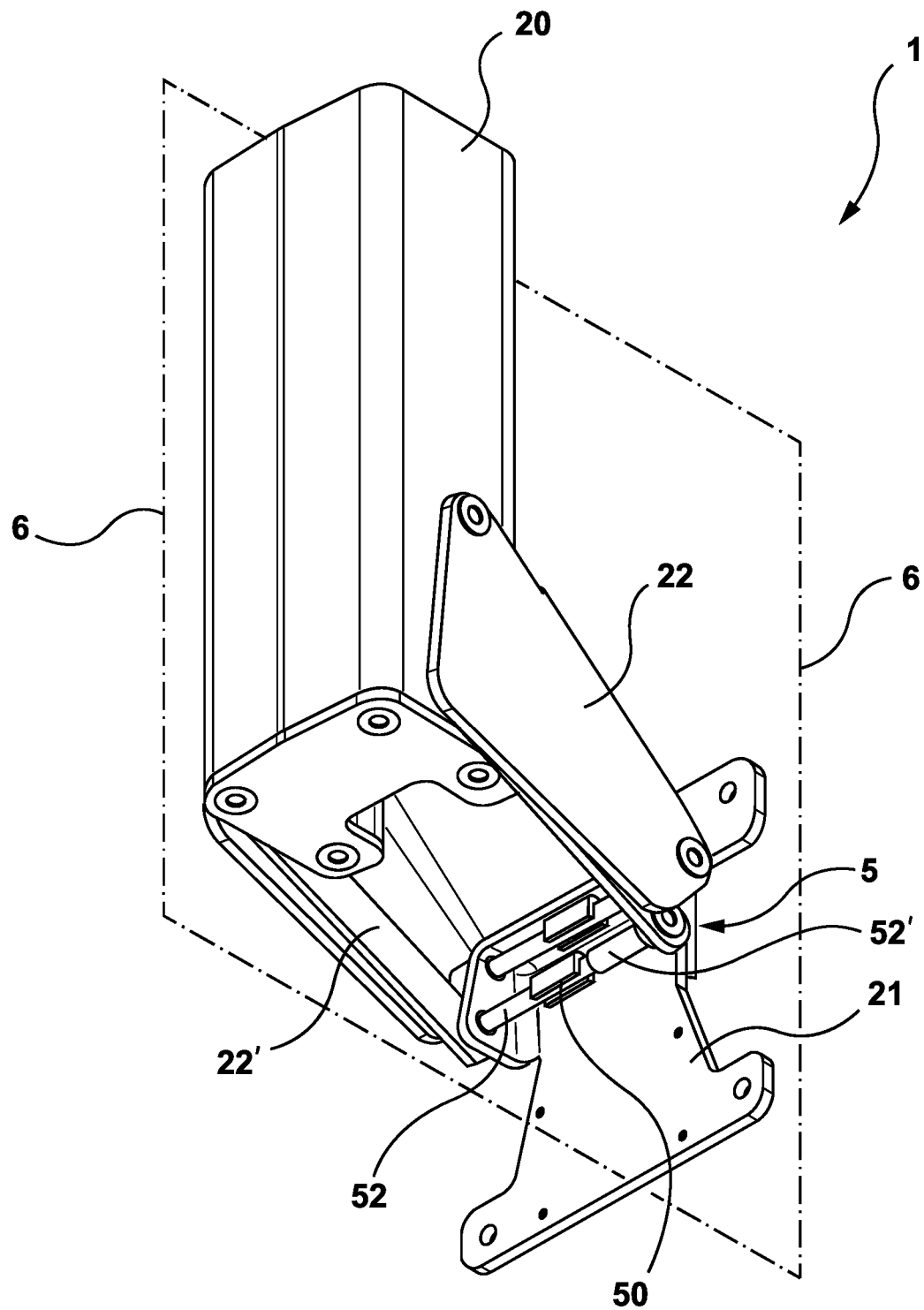
Figure 10:
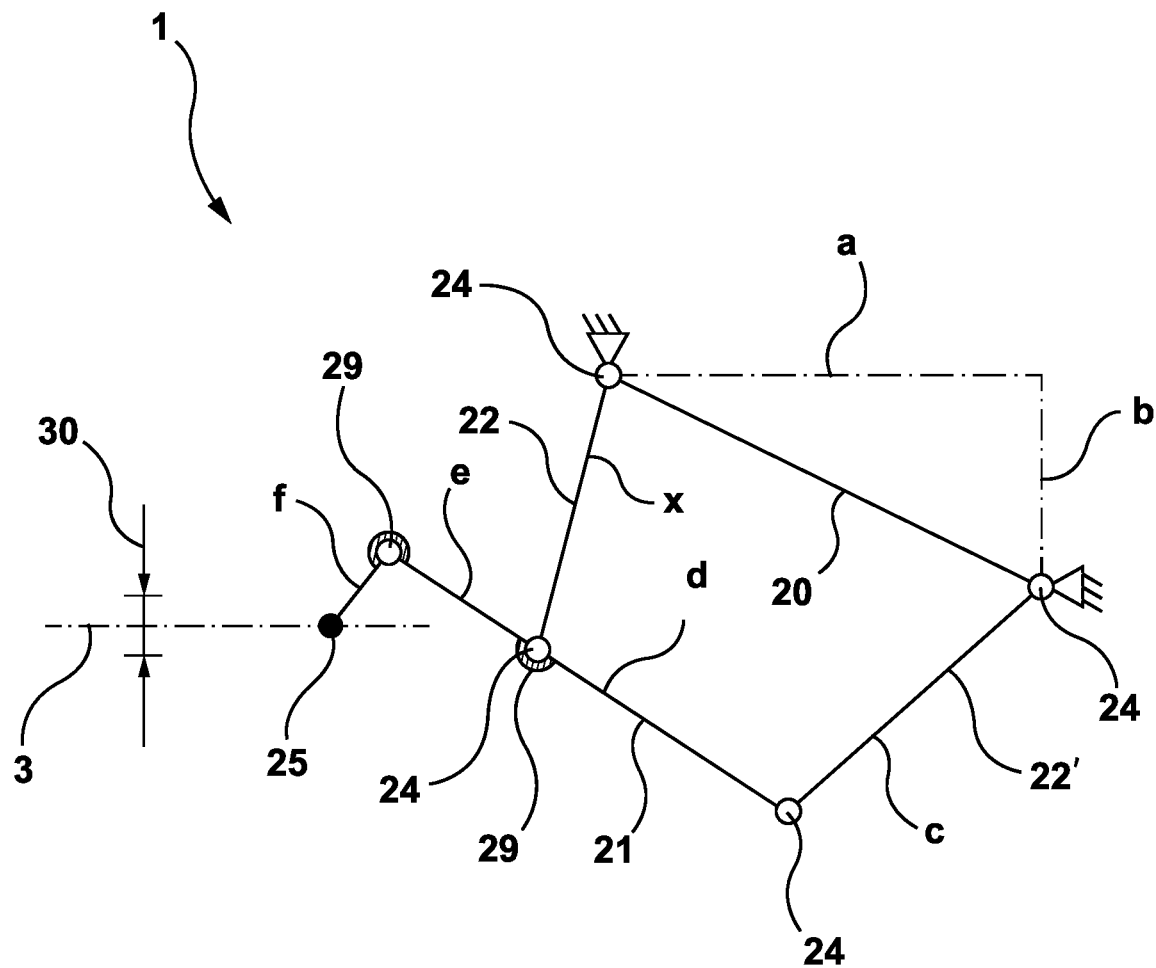
Figure 11:
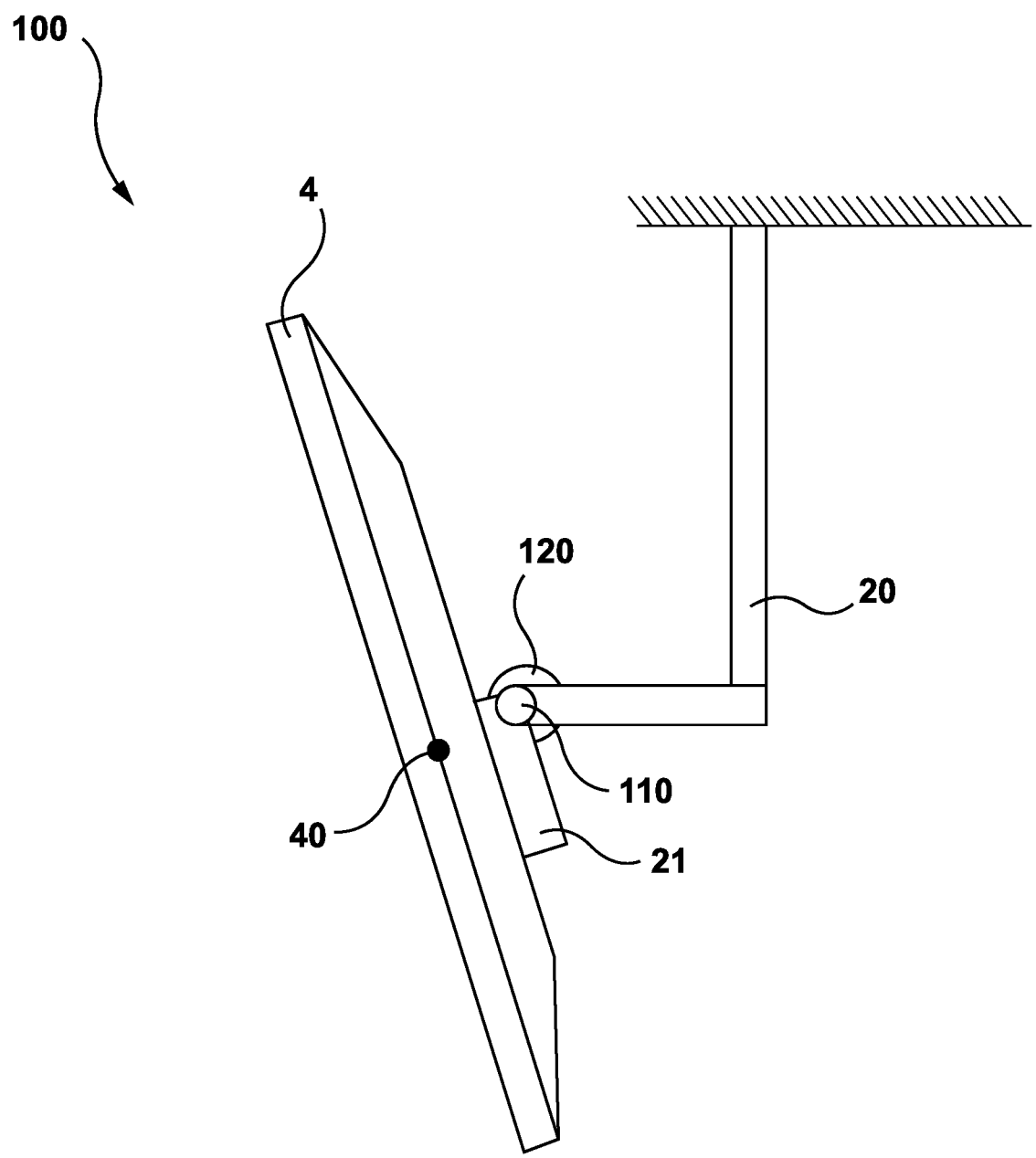
Figure 12:
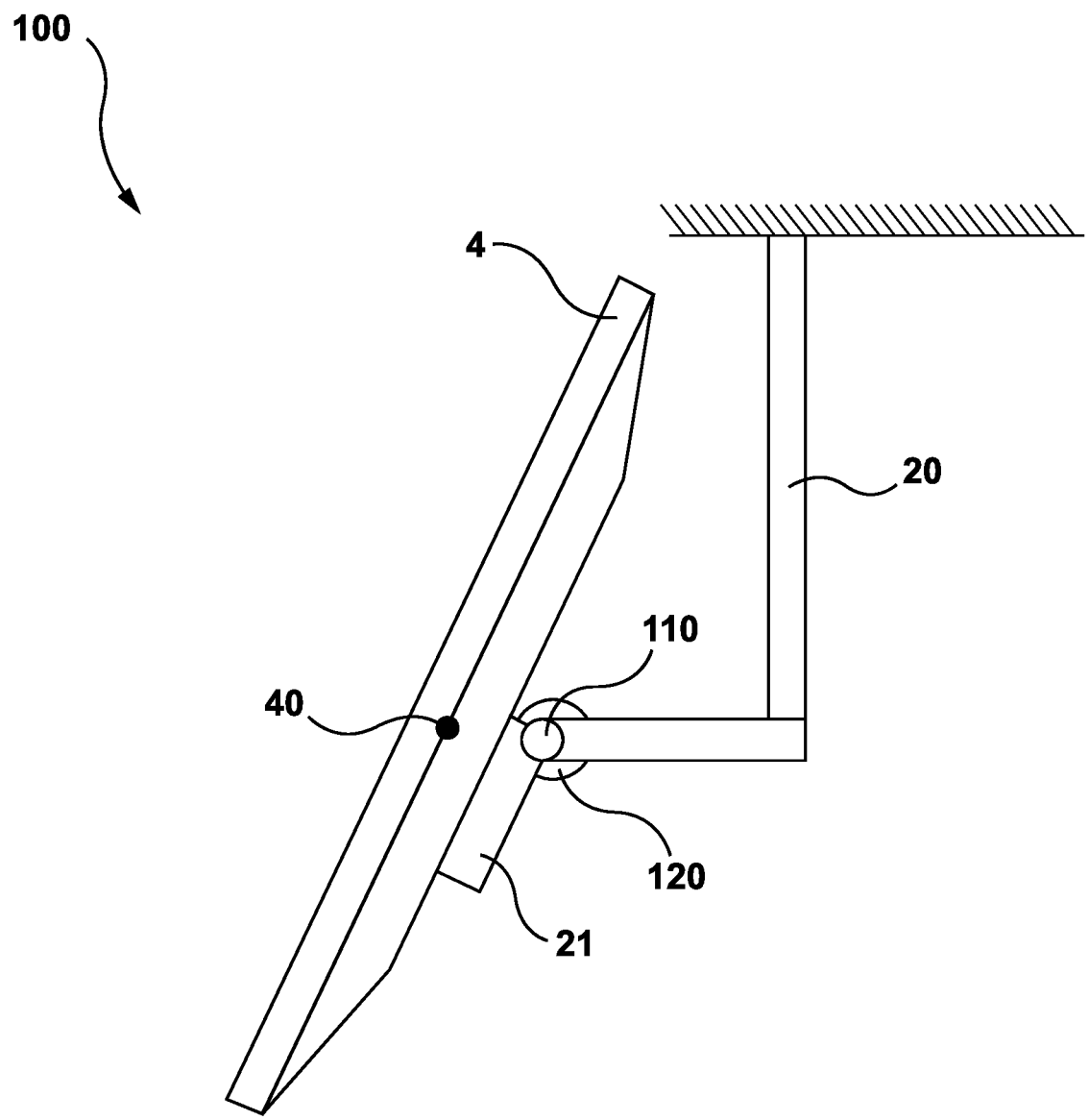

Preferred further embodiments of the invention will be explained by the following description of the figures in detail. Here shows:

FIG. 1 schematically a side view of the device for carrying a monitor according to a first embodiment;

FIG. 2 schematically a further side view of the device of FIG. 1;

FIG. 3 schematically the device of FIG. 1 including a monitor mounted thereon;

FIG. 4 schematically the device of FIG. 2 including the monitor mounted thereon;

FIG. 5 schematically a side view of a device for carrying a monitor according to a further embodiment;

FIG. 6 schematically a side view of a device for carrying a monitor according to a further embodiment;

FIG. 7 schematically a side view of a device for carrying a monitor according to a further embodiment;

FIG. 8 schematically a perspective side view of the device of FIG. 7;

FIG. 9 schematically a further perspective side view of the device of FIG. 7;

FIG. 10 schematically a schematic sketch of a device for carrying a monitor according to a further embodiment;

FIG. 11 schematically a side view of a device for carrying a monitor according to an alternative embodiment; and FIG. 12 schematically a further side view of the device of FIG. 11;

DETAILED DESCRIPTION OF PREFERRED EMBODIMENTS

In the following preferred exemplary embodiments are described with reference to the figures. Here identically, similar or elements appearing identically are denoted by using identical reference signs in the various figures, and a description of said elements is partly not repeated in order to avoid redundancies.

In FIG. 1 a side view of the device for carrying a monitor is schematically shown according to a first embodiment. The device 1 comprises a connection element 21 for connecting to the monitor, and a support frame 20 for supporting the device 1 against the environment, wherein the connection element 21 and the support frame 20 are arranged pivotably relative to one another. In order to provide the pivotability of the connection elements 21 relative to the support frame 20, they are pivotably connected to each other by means of a coupling transmission 2.

The coupling transmission may for example be configured as a 4-part double swingarm. This way, the support frame 20 is configured as a frame of the coupling transmission. The connection element 21 provides the swing arm of the coupling transmission. The connection element 21 and the support frame 20 may be connected by means of coupling parts 22, 22', wherein each of the coupling parts 22, 22' is rotatably connected on an end to the connection element 21 by means of a rotary joint 24 and is connected on another end to the support frame 20 by means of a further rotary joint 24, respectively.

By means of the reference sign 26, trajectories of rotary joints 24 of the connection element 21 are denoted. In addition, the curvature designated by the reference sign 27 shows an oscillation curve of a predefined point 25 which is always on a fixed position relative to the connection element 21. In other words, the point 25 oscillates together with the connection element 21 or is connected to it at least in an imaginary way.

The coupling transmission 2 in the present invention is configured such that the predetermined point 25 is guided during a pivoting of the connection element 21 by means of the coupling transmission 2 relative to the support frame 20 along a predefined path length 32 of the oscillation curve 27 in the region 30 of a horizontal plane 3. In other words, the coupling transmission 2 is configured in a way that a basically horizontal straight guidance 9 of the point 25 is provided along the predetermined path length 32.

Region 30 is to be understood that the point 25 does not have to remain at exactly the same elevation level, but the point may also slightly shift relative to the elevation level thereof or the horizontal plane 3. In other words, the position of point 25 may vary here within a certain tolerance upwards or downwards, here about ±0.2 cm. Alternatively, also other tolerance specifications may be defined.

The device 1 is configured for connecting to a monitor on the backside thereof, that is behind the monitor.

FIG. 2 schematically shows a further side view of the device 1 of FIG. 1. Compared to FIG. 1, the connection element 21 is pivoted about a predetermined pivot angle. This way, point 25 has been moved correspondingly along the oscillation curve 27 thereof, thus it has the position shown in FIG. 2. As the movement of the point 25 was performed within the predetermined path length 32, point 25 has been basically kept on the same elevation level.

FIG. 3 schematically shows the device 1 of FIG. 1 including a monitor 4 mounted thereon. The connection element 21 and the coupling transmission 2 are adapted and configured in a way that the point 25 corresponds to a center of gravity 40 of the monitor 4 mounted on the connection element 21.

Thus, the monitor 4 may be pivoted by being pivoted using the coupling transmission 2 by a rotation of the parts 20, 21, 22, 22' by means of the rotary joints 24 relative to the support frame 20 together with the connection element 21 mounted thereon (or vice versa).

In FIG. 4, a correspondingly pivoted monitor 4 is shown having an orientation, which has been changed according to the pivot movement as compared to FIG. 3, which schematically shows the device 1 of FIG. 2 having the monitor 4 mounted thereon. As immediately obvious, during pivoting of the monitor 4 from a first orientation of the monitor 4 in the surrounding space (see FIG. 3) due to the coupling transmission 2 to a different second orientation in the surrounding space (see FIG. 4), the center of gravity 40 of the monitor 4 may be held basically on the level of the horizontal plane 3.

FIG. 5 schematically shows a side view of a device 1 for carrying a monitor 4 according to a further embodiment. The configuration of device 1 basically corresponds to the one of FIG. 1. For connecting to the monitor 4, the connection element 21 comprises a panel 28, which may be connected to a connection component of the monitor 4 by means of connection elements, as for example bolts (not shown).

The device 1 in the present embodiment is also configured such that a pivoting of the monitor 4 or of the connection element 21 by means of the coupling parts 22, 22' relative to the support frame 20 does not cause a change in the elevation level of the center of gravity 40 of the monitor 4. The center of gravity 40 may thus be held on the level of the horizontal plane 3.

In FIG. 6, a side view of the device 1 for carrying a monitor 4 is schematically shown according to a further embodiment, which comprises an 8-part coupling transmission 2. At the support frame 20, two L-shaped parts 23 are rotatably mounted spaced from each other, which define additional coupling parts. As the rotary joints 24 for connection to the support frame 20 are provided in a middle portion of the parts 23, regarding the number of parts of the coupling transmission each of the parts 23 may be regarded as two single parts 23', which are rotatably fixed connected to one another. In addition, the L-shaped parts 23 are respectively connected to an upper coupling part 22 on one end thereof in a pivotable way and are connected to the other coupling part 22' on the other end in a pivotable way. Rotary joints 24 for connecting the parts to the upper and lower coupling parts 22, 22' are here arranged on each coupling part 22, 22' spaced to each other, wherein the distance thereof at the upper and at the lower coupling part 22, 22' is preferably identical. The coupling parts 22, 22' are connected to the connection element 21 on an opposite end, respectively, in a pivotable way. The 8 parts of the coupling transmission 2 are thus formed by the 4 single parts 23', the two coupling parts 22, 22', the support frame 20, and the connection element 21.

By the configuration of the coupling transmission 2 shown in FIG. 6, a predetermined point 25 which is held relative to the connection element 21 in a fixed position, which corresponds to the center of gravity 40 of the monitor 4 in the mounted state may be held during pivoting of the connection element 21 or of the monitor 4 by means of the coupling transmission 2 relative to the support frame 20 within a predefined pivot angle in a region of a fixed point in space. In other words, during a pivot movement of the monitor 4 by means of the coupling transmission 2, the center of gravity 40 essentially remains at the same spatial coordinates.

FIG. 7 schematically shows a side view of a device 1 for carrying a monitor 4 (not shown) according to a further embodiment. The device basically corresponds to those of FIGS. 1 to 5. The support frame 20 is configured as an extrusion profile. An upper coupling part 22 and a lower coupling parts 22' are rotatably mounted on the support frame 20 by means of rotary joints 24. The coupling parts 22, 22' are rotatably connected on the other ends thereof to the connection element 21 by means of further rotary joints 24. In the present embodiment, the upper coupling part 22 is formed such that it overlaps the lower coupling part 22' on the outside in order to be able to provide a protection against injury of a finger of a user caused by the scissor elements. In order to illustrate the configuration of the coupling transmission 2 in a graphical way, the coupling part 22' is illustrated as transparent relative to the coupling part 22 in FIG. 7.

Due to the coupling transmission 2 it is possible to carry a monitor which is to be supported by the device 1 from behind. In other words, the device 1—in a system consisting of device 1 and the monitor the mounted thereon—is arranged behind the monitor, that is on the backside thereof. Here, due to the length of the single parts 20, 21, 20, 22, 22' of the coupling transmission 2 or of the position of the single rotary joints 24 of the coupling transmission 2 relative to another during a pivoting the connection element 21 relative to a support frame 20, the point 25, which corresponds to a center of gravity 40 of a mounted monitor 4 due to the configuration of the coupling transmission 2, may be held essentially on the elevation or the region of the elevation level of the horizontal plane 3.

FIG. 8 schematically shows a perspective side view of the device 1 of FIG. 7. Here, it may be easily recognized, that the coupling parts 22, 22' are provided twice, wherein the coupling parts 22, 22' are arranged relative to a symmetry plane 6 on both sides of the support frame 20 in a mirror-symmetrical way. In the present embodiment, the two upper coupling parts 22 are provided as a double bent sheet-metal formed as one part. The two lower coupling parts 22' are preferably formed as separate rod elements, preferably a sheet shaped material.

The connection element 21 is provided as an approximately x-shaped panel including bent tabs which serve as a hinged connection to the coupling parts 22, 22'.

FIG. 9 schematically shows a further perspective side view of the device 1 of FIG. 7. The rotary joints 24 each comprise a sliding bearing 5 arranged in the tabs including a collar, in which a screw 52 is received, respectively. The screws 52 are clamped in the sliding bearings 5 of the connection element 21 by means of long nuts 50, wherein a screw 52 is clamped to the opposite screw—relative to the symmetry plane 6—by a nut 50, respectively. By means of that clamping, a pressure force for providing a frictional force at the rotary joint is provided, which inhibits that the coupling transmission 2 pivots away from the set position due to the mass of the monitor. In addition, it may be ensured by means of the frictional force that the coupling transmission 2 is not pivoting on its own, in case the center of gravity 40 of the monitor 4 is not exactly located in the assumed point 25 (see FIG. 7).

Alternatively or in addition, also the rotary joints 24 may be configured with sliding bearings at the support frame 20.

Further, the device comprises a cable attachment which is not shown here for supporting and/or guiding connection cables for the monitor.

In addition, at least the rotary joints 24 of the connection element 21 may be optionally formed to be frictionally decoupled at least when pivoting against a direction of a torque acting on the coupling transmission 2 due to gravity of a mass of the mounted monitor 4 over the distance to the center of gravity 40. Hereto, an optional sprag (or overrunning) clutch may be preferably provided at the rotary joints 24.

FIG. 10 schematically shows a schematic sketch of a device 1 for supporting a monitor according to a further embodiment. It basically corresponds to the device shown in FIGS. 1 and 7, respectively, wherein Table 1 below lists various configurations of the lengths of the individual parts 20, 21, 22, 22' of the coupling transmission 2, denoted as "Konf.", by means of which regarding the 4-part coupling transmission 2 shown in FIG. 10 the device 1 provides essentially a horizontal straight guidance 9 of point 25 over a predetermined path length. In other words, the configurations listed in table 1 provide specific embodiments for which the point 25 may be kept within the region 30 relative to the horizontal plane 3. The reference signs a to f and x are used to specify the respective lengths of the parts 20, 21, 22, 22'.

The connection element 21 includes a division/separation in a region between the rotary bearings 24, designated by the reference sign d, and the region beyond the rotary bearing 24, which connects the connection element 21 to the coupling part 22, designated by the reference sign e. In addition, a distance to the point 25 orthogonal to a longitudinal extension of the connection element 21 is denoted by the reference sign f. The regions e and d of the connection element 21 are connected by a rotatably fixed connection 29. Also, the regions e and f are connected to each other by a rotatably fixed connection 29.

The position of the two rotary joints 24 of the support frame 20 relative to each other is divided into a horizontal component which is denoted by the reference sign a, and a vertical component which is denoted by the reference sign b.

The length of part 20 results thus from the sum of the regions a and b. The length of the part 22 results thus corresponding to the length of the region x.

ing around the rotary joint 110 by applying an external force. This is mainly provided by the motor 120.

The device 100 also comprises an optional sensor element adapted as a torque sensor which is not shown. The device 100 is here configured in a way that when the measured value detected by the sensor element is larger than or equal to a predetermined threshold, the motor is activated for supporting the pivot movement. In case a user applies a torque on the monitor 4 and thus the connection element 21, thus is detected by the sensor element. The motor 120 applies a torque on the connection element 21 corresponding to the amount of the detected torque in order to support the pivot movement of the monitor 4 which has been induced by the user. In case the torque applied by the user sinks below the threshold, the motor 120 is switched-off.

The device 100 may further comprise optionally an operation switch (not shown) for operating the motor, wherein the operation switch comprises a first switching position, which corresponds to a switched-off state of the motor, a second switching position for operating the motor in a first direction of rotation, and a third switching position for operating the motor in the direction of rotation opposite to the first direction of rotation.

The motor 120 of the embodiment according to FIG. 10 or 11 may thus be combined with the other embodiments

TABLE 1

| | Preferred embodiments: | | | | | | | | |
|---|---|---|---|---|---|---|---|---|---|
| Glied | Konf. 1 | Konf. 2 | Konf. 3 | Konf. 4 | Konf. 5 | Konf. 6 | Konf. 7 | Konf. 8 | Konf. 9 |
| a | 30 mm | 0 mm | 30 mm | 32 mm | 85 mm | 0 mm | 0 mm | 0 mm | 0 mm |
| b | 37 mm | 138 mm | 48 mm | 55 mm | 90 mm | 55 mm | 64 mm | 59 mm | 59 mm |
| c | 129 mm | 105 mm | 110 mm | 116 mm | 184 mm | 105 mm | 90 mm | 118 mm | 115 mm |
| d | 18 mm | 52 mm | 23 mm | 23 mm | 34 mm | 21 mm | 24 mm | 21 mm | 21 mm |
| e | 56 mm | 0 mm | 55 mm | 55 mm | 38 mm | −11 mm | 28 mm | −11 mm | −10 mm |
| f | 55 mm | 60 mm | 20 mm | 30 mm | 70 mm | 60 mm | 53 mm | 60 mm | 60 mm |
| x | 111 mm | 46 mm | 116 mm | 115 mm | 104 mm | 80 mm | 96 mm | 91 mm | 91 mm |

"Glied" means "part".

FIG. 11 schematically shows a side view of a device 100 for carrying a monitor 4 according to a further embodiment. The device 100 comprises a connection element 21 for connecting to a monitor 4, and a support frame 20 for supporting the device 100 against the environment, wherein the connection element 21 and the support frame 20 are arranged pivotably relative to one another. The pivotability of the connection element 21 relative to the support frame 20 is provided by means of a rotary joint 110 which is configured as a rotary bearing including a fixed axis of rotation (not shown). In addition, the device 100 comprises a motor 120 adapted as electric motor, which is arranged in the region of the rotary joint 110, and is configured in a way that it provides a torque by means of which the connection element 21 including the monitor 4 may be pivoted relative to the support frame 20.

FIG. 12 schematically shows a further side view of the device 100 of FIG. 1. Compared to the representation in FIG. 11, the connection element 21 is pivoted upwards about a predetermined pivot angle. This way, the center of gravity 40 of the monitor 4 has been moved upwards, when viewed in the direction of gravitation. Thus, the monitor 4 includes an increased energy potential as compared to a position of FIG. 11. In other words, in order to move the monitor 4 from the position shown in FIG. 11 towards the position shown in FIG. 12, the monitor has to be supplied with elevation energy. This is to be applied correspondingly during pivot-described above including further parts and controls. In particular, it may then be connected to a corresponding one of the rotary joints of the other embodiments.

Where applicable, any single features which are presented in the exemplary embodiment may be combined and/or replaced by another without leaving the scope of the invention.

LIST OF REFERENCE NUMBERS

1 Device
2 Coupling transmission
20 Support Frame
21 Connection element
22, 22' Coupling part
23, 23' Further part
24 Rotary Joint
25 Point
26 Trajectory
27 Oscillation curve
28 Panel
29 Rotatably fixed connection
2 Horizontal Plane
30 Region
32 Path length
4 Monitor
40 Center of gravity 5 Sliding bearing
50 Nut
52 Screw or Bolt
6 Symmetry Plane
100 Device
110 Rotary Joint
120 Motor
a-f, x Length of parts

The invention claimed is:

1. A device (1) for carrying a monitor (4) comprising a connection element (21) for connection to a monitor (4) and a support frame (20) rigidly connected to an environment for supporting the device (1) against the environment, wherein the connection element (21) and the support frame (20) are arranged pivotably relative to one another, characterized in that the support frame (20) and the connection element (21) are connected by means of a non-uniformly translating transmission for providing the pivotability of the connection element (21) relative to the support frame (20) which are connected pivotably to each other,
  wherein the non-uniformly translating transmission is a coupling transmission (2), and
  wherein the non-uniformly translating transmission is configured in a way that a straight horizontal guidance (9) along a predetermined path length (32) is provided for a predefined point (25) being held at a fixed position relative to the connection element (21) and corresponding to a center of gravity (40) of a monitor (4) connected to the connection element (21) during a pivot movement of the connection element (21) without a change in elevation of the center of gravity (40) by means of the coupling transmission (2) relative to the support frame (20) within a predefined pivot angle.

2. The device (1) according to claim 1, wherein the non-uniformly translating transmission is configured in a way that the predefined point (25) which is held at the fixed position relative to the connection element (21), is guidable during pivoting movement of the connection element (21) by means of the non-uniformly translating transmission relative to the support frame (21) within the predefined pivot angle along the predefined path length (32) in a region (30) of a horizontal plane (3).

3. The device (1) according to claim 2, wherein the region has an elevation tolerance of ±1 cm.

4. The device (1) according to claim 1, wherein the coupling transmission (2) is configured as a 4-part, or 8-part (5) coupling transmission (2).

5. The device (1) according to claim 1, wherein the coupling transmission (2) is formed as a double swingarm.

6. The device (1) according to claim 1, wherein the connection element (21) corresponds to a swing arm of the coupling transmission (2).

7. The device (1) according to claim 1, wherein the coupling transmission (2) comprises coupling parts (22, 22', 23, 23') between the support frame (20) and the connection element (21), wherein the coupling parts (22, 22', 23, 23') are provided twice, wherein the coupling parts (22, 22', 23, 23') are arranged relative to a symmetry plane (6) in a mirror-symmetrical way.

8. The device (1) according to claim 1, further comprising a motor for assisting the pivot movement of the connection element (21) relative to the support frame (20).

9. The device (1) according to claim 8, further comprising a sensor element for detecting at least one measured value, wherein the device is configured such that when the measured value detected by the sensor element is larger than or equal to a predetermined threshold, the motor is activated to assist the pivot movement.

10. The device (1) according to claim 9, wherein the sensor element for detecting the at least one measured value is a force sensor and/or a torque sensor.

11. The device (1) according to claim 8, further comprising an operation switch for operating the motor, wherein the operation switch comprises a first switching position, which corresponds to a switched-off state of the motor, a second switching position for operating the motor in a first direction of rotation, and a third switching position for operating the motor in the direction of rotation opposite to the first direction of rotation.

12. The device (1) according to claim 1, wherein the support frame (20) and the connection element (21) are pivotably connected to each other by a rotary joint for providing the pivotability of the connection element (21) relative to the support frame (20), in particular a rotary joint of the non-uniformly translating transmission, wherein a motor (120) is provided to assist the pivot movement of the connection element (21) relative to the support frame (20), wherein the motor (120) acts on the rotary joint.

* * * * *